United States Patent [19]

Kaneko

[11] Patent Number: 4,783,832
[45] Date of Patent: Nov. 8, 1988

[54] IMAGE PROCESSING APPARATUS
[75] Inventor: Makoto Kaneko, Ootawara, Japan
[73] Assignee: Kabushiki Kaisha Toshiba, Kawasaki, Japan
[21] Appl. No.: 921,384
[22] Filed: Oct. 22, 1986
[30] Foreign Application Priority Data
  Oct. 25, 1985 [JP]   Japan .................... 60-239032
[51] Int. Cl.$^4$ .......................... G06K 9/36
[52] U.S. Cl. ............................ 382/41
[58] Field of Search ................ 382/41, 17
[56]           References Cited
       FOREIGN PATENT DOCUMENTS
    2409173  9/1975  Fed. Rep. of Germany .

Primary Examiner—James J. Groody
Assistant Examiner—Michael D. Parker
Attorney, Agent, or Firm—Oblon, Fisher, Spivak, McClelland & Maier

[57]           ABSTRACT

An image processing apparatus includes an image memory for storing digital image data obtained by A/D-converting a video signal, an arithmetic circuit for performing an arithmetic operation of the image data so as to emphasize an edge, a first plane memory for storing the edge image data, and a second plane memory for storing binary data of all "1"s or "0"s. The first and second plane memories are addressed in response to address data from an address generator. The readout edge image data and the binary data are processed to paint the edge image. That is, the area surrounded by the edge line is painted with the binary data.

6 Claims, 6 Drawing Sheets

F I G. 10
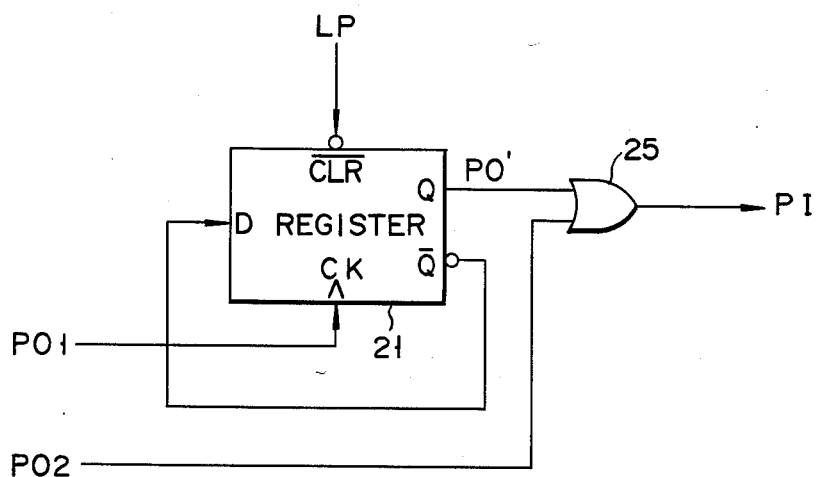
F I G. 11
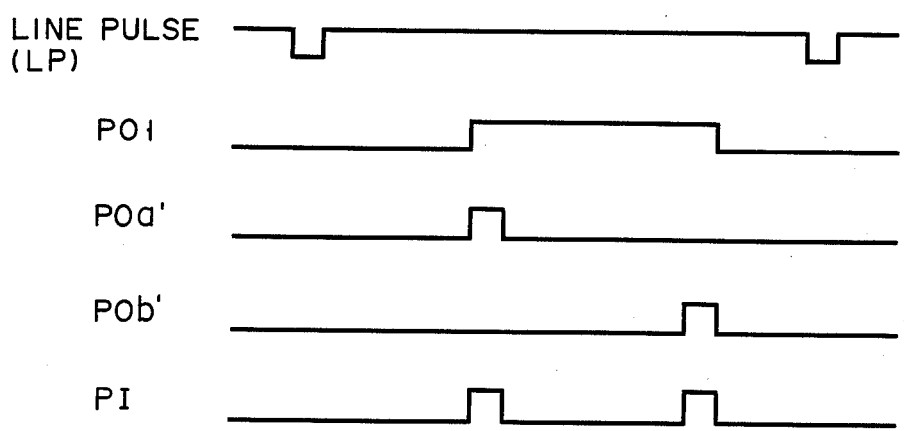

IMAGE PROCESSING APPARATUS

BACKGROUND OF THE INVENTION

The present invention relates to an image processing apparatus, and more particularly, to an image processing apparatus for extracting an area surrounded by an edge line as an area of interest.

Image processing apparatuses have been used in a variety of industrial fields. In particular, image processing apparatuses are utilized in medical electronics to process X-ray, ultrasonic, and MRI images. In medical image processing, a line is drawn to surround a specific area of a medical diagnosis image, and an image portion in the specific area is emphasized with reference to the edge. For example, in order to measure a volume of a heart, the edge of the heart is extracted from its tomographic image. The inner volume of the heart is measured on the basis of the edge image. In this case, in order to obtain an image of the area surrounded by the edge line, image processing called painting is performed. Painting is performed by software according to a conventional technique, thus requiring a long period of time.

SUMMARY OF THE INVENTION

It is an object of the present invention to provide an image processing apparatus capable of shortening image processing time for painting an area defined by an edge line.

According to the present invention, a video signal is converted by an A/D converter into digital image data, and the image data is stored in an image memory. Image processing is performed to emphasize the edge of the image represented by the image data stored in the image memory. Edge image data is stored in a first plane memory. A second plane memory stores binary data having all "1"s or "0"s. The first and second plane memories can be addressed by address data from an address generator. The readout edge image data and binary data are subjected to logical operations to achieve painting. In other words, the area surrounded by the edge line is painted by the binary data.

BRIEF EXPLANATION OF THE DRAWINGS

FIG. 10 is a block diagram of an arithmetic/ process circuit of an image processing apparatus according to another embodiment of the present invention;

FIG. 11 is a timing chart for explaining the operation of the circuit of FIG. 10;

DETAILED EXPLANATION OF THE PREFERRED EMBODIMENTS

Figure 1:
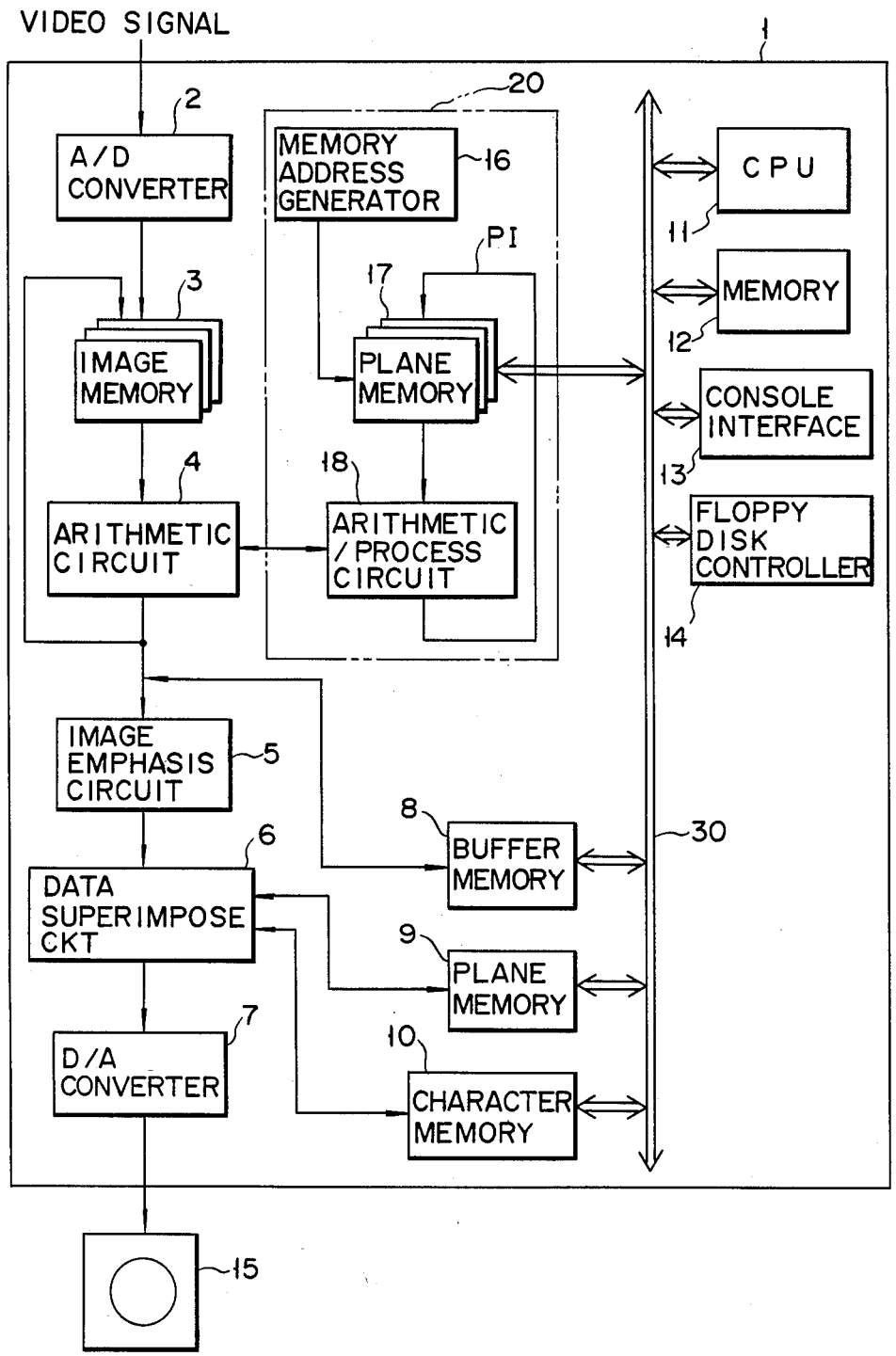
FIG. 1 is a block diagram of an image processing apparatus according to an embodiment of the present invention.

In an embodiment of FIG. 1, a video signal input to A/D converter 2 includes a diagnostic image signal (e.g., an X-ray signal from an X-ray apparatus, an ultrasonic image signal from an ultrasonic apparatus, an MRI image signal from an MRI apparatus), and other image signals. The output terminal of converter 2 is connected to the write terminal of image memory 3. Memory 3 stores digital image data from converter 2. The read terminal of memory 3 is connected to the image terminal of arithmetic circuit 4. Arithmetic circuit 4 performs arithmetic operations such as a subtraction of the image data read out from image memory 3.

The output terminal of arithmetic circuit 4 is connected to the write terminal of memory 3 and the input terminal of image emphasis circuit 5. When image data is normally processed, 12-bit image data is used. However, when image data is displayed or printed out, 12-bit image data is converted into 8-bit data. This bit conversion is performed by image emphasis circuit 5.

The output terminal of image emphasis circuit 5 is connected to the input terminal of data superimpose circuit 6. Circuit 6 is arranged to superimpose display or printing character data on image data. The output terminal of circuit 6 is connected to TV monitor 15 through D/A converter 7.

The output terminal of arithmetic circuit 4 is connected to buffer memory 8, and data superimpose circuit 6 is connected to plane memory 9 and character memory 10. Memories 8, 9, and 10 are connected to CPU 11, memory 12, console interface 13, and floppy disk controller 14 through bus line 30.

Figure 2:
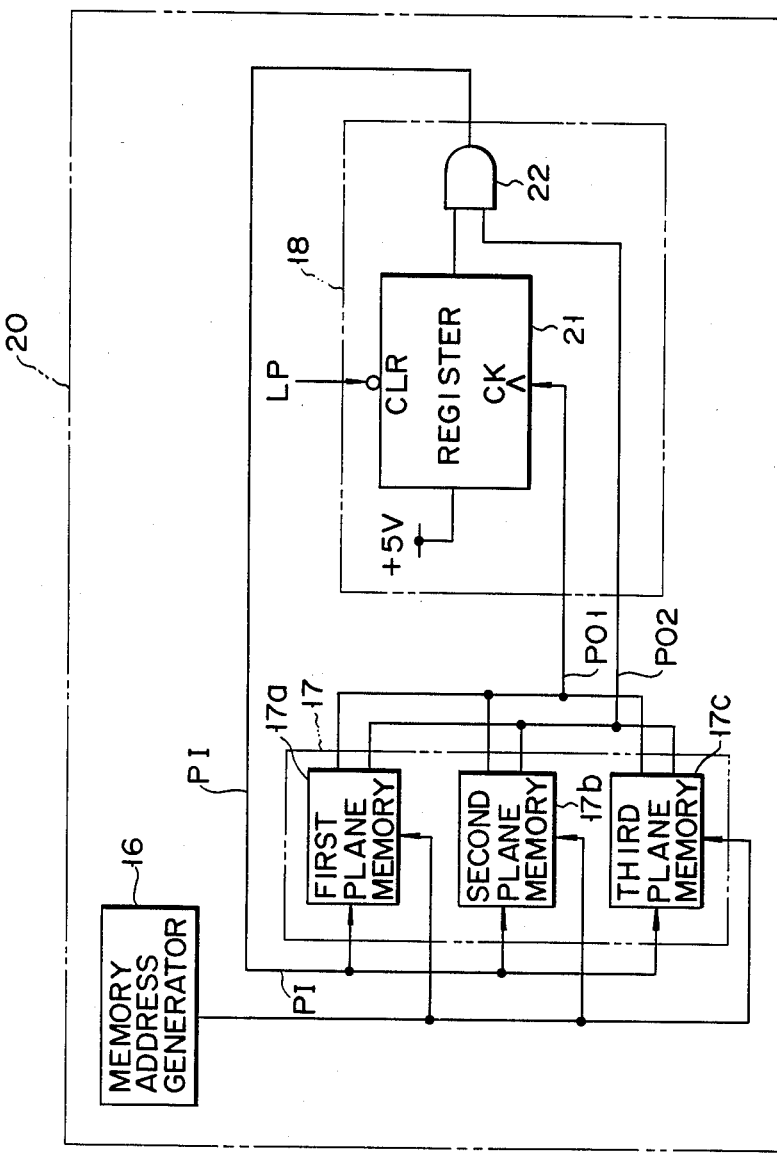
FIG. 2 is a circuit diagram of a painting circuit.

Painting circuit 20 includes memory address generator 16, plane memory 17 addressed by generator 16, and arithmetic circuit 18 connected to the read terminal of memory 17. The output terminal of arithmetic circuit 18 is connected back to memory 17. As shown in FIG. 2, memory 17 comprises first, second, and third plane memories 17a, 17b, and 17c each having the same memory size as that of image memory 3. Arithmetic circuit 18 comprises register 21 connected to the read terminals of memory 17a to 17c, and AND gate 22 connected to the output terminal of register 21 and the the read terminals of memories 17a to 17c. The output terminal of AND gate 22 is connected to write terminals of memories 17a to 17c.

The operation of the image processing apparatus having the arrangment described above will be described below. A video signal supplied from an external apparatus is converted into digital image data by A/D converter 2. The digital image data is stored in image memory 3. Image data is read out from memory 3 and is supplied to arithmetic circuit 4. Arithmetic circuit 4 performs known arithmetic operations such as a subtraction. The image data processed by arithmetic circuit 4 is written again in image memory 3. The edge image data is obtained by setting a threshold level to arithmetic circuit 4, analyzing image data fetched into buffer memory 8 according to a software algorithm, or drawing an edge line by the operator watching the image.

The processing image data is bit-converted by image emphasis circuit 5. The bit converted image data is supplied to data superimpose circuit 6. Circuit 6 superimposes character data on image data. The character data is stored in character memory 10 and is read out as needed and supplied to circuit 6. Image data from circuit 6 is supplied to TV monitor 15 and displayed as an image (e.g., an X-ray CT image, an ultrasonic tomogram, or an MRI image) thereon.

Figure 3:
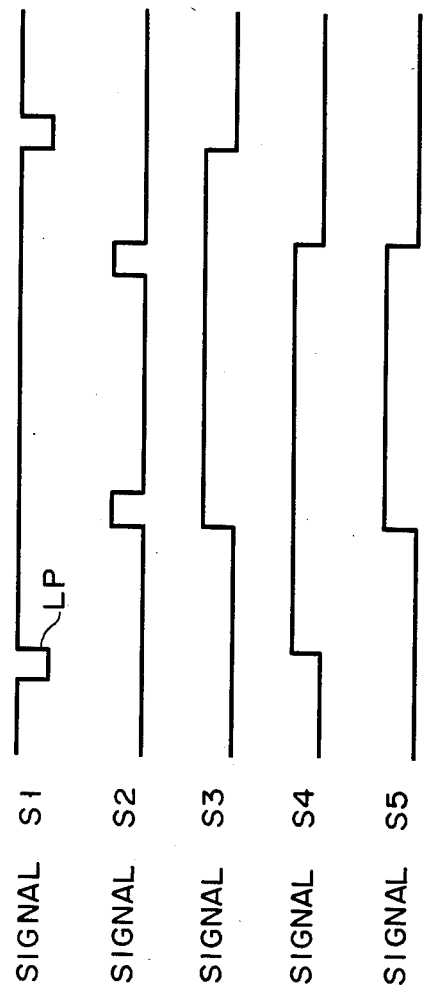
FIG. 3 is a timing chart for explaining the operation of the painting circuit in FIG. 2.

The edge image (e.g., edge image G in FIG. 4) from arithmetic circuit 4 is stored in first plane memory 17a in memory circuit 17 in painting circuit 20 through buffer memory 8. All "1" binary data g shown in FIG. 5 is prestored in second plane memory 17b. In this state, when memory address generator 16 generates read address data for reading out data in a direction of arrow a in FIG. 4, first to third plane memories 17a to 17c are addressed in the direction of arrow a. The data signals read out from memories 17a and 17b are supplied to the clock terminal (CK) of register 21 and AND gate 22 through output lines PO1 and PO2. Register 21 is reset for every horizontal line in response to pulse LP of signal S1 of FIG. 3 input to the clear terminal (CLR) thereof. When edge data G is supplied from memory 17a to register 21 through output line PO1, register 21 generates pulse S3 in response to the leading edge of the first pulse of signal S2 in FIG. 3. Pulse S3 is supplied to one input terminal of AND gate 22. Data (S4) from second plane memory 17b, i.e., all "1" binary data G, is input to the other input terminal of AND gate 22 through line PO2. An AND signal of signals S3 and S4, i.e., signal S5 is output from AND gate 22. This output signal S5 is input to third plane memory 17c through line PI and stored therein. In this case, image data stored in memory 17c represent pattern G1 obtained by painting the edge image of FIG. 4 to the right from the left end.

Figure 4:
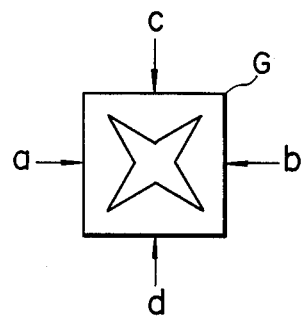
FIGS. 4 to 9 are views for explaining steps in painting.
Figure 5:
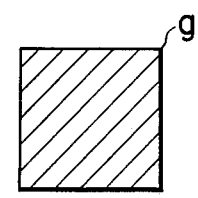
Figure 6:
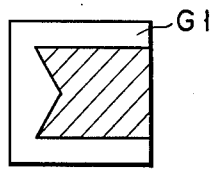
Figure 7:
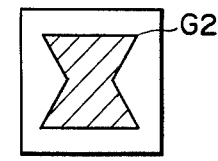

Memory address generator 16 generates address data for addressing the memory in a direction of arrow b in FIG. 4. In response to this address data, memory 17a which stores pattern G and memory 17c which stores pattern G1 are accessed. Therefore, image data including patterns G and G1 is supplied to AND gate 22 in units of lines. Image data through AND gate 22 is stored in memory 17b. When all contents of memories 17a and 17c are read out, memory 17b stores image data representing a pattern in FIG. 7, i.e., pattern G2 obtained by painting with logic "1" the area between the right and left ends defined by the edge in FIG. 4.

Figure 8:
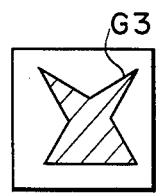

Memory address generator 16 then outputs address data for addressing the memories in a direction of arrow c in FIG. 4. In response to this address data, memory 17b which stores pattern G2 and memory 17a which stores pattern G are accessed. Therefore, image data representing patterns G and G2 is supplied to AND gate 22 in units of lines. Image data through AND gate 22 is stored in memory 17c. When all contents of memories of 17a and 17b are read out, memory 17c stores image data representing pattern G3 (FIG. 8) obtained by notching the upper portion of pattern G2 by the upper edge in FIG. 4.

Memory address generator 16 further outputs address data for addressing the memories in a direction of arrow d in FIG. 4. In response to this address data, third plane memory 17c which stores pattern G3 and first plane memory 17a which stores pattern G are accessed. Therefore, image data representing patterns G and G3 is supplied to AND gate 22 in units of lines. Image data through AND gate 22 is stored in second plane memory 17b. When all contents of memories 17a and 17c are read out, memory 17b stores image data representing pattern G4 (FIG. 9) obtained by notching the lower portion of pattern G3 by the lower edge in FIG. 4.

Painting of the edge image in FIG. 4 is performed as described above. Painted image data (FIG. 9) is input to arithmetic circuit 4 through arithmetic circuit 18. Arithmetic circuit 4 excutes operations for masking or rewriting the image data stored in image memory 3 by the image data representing pattern G4 and supplies image data representing pattern G4 to TV monitor 15 through image emphasis circuit 5, data superimpose circuit 6, and A/D converter 7. Therefore, TV monitor 15 displays the processed image.

CPU 11 counts the number of logic "1"s of the painted image data. The area surrounded by the edge line can be measured by the count. An inner volume of an object to be examined, e.g., a heart, can be calculated on the basis of the detected area.

In the above embodiment, if the edge image data of FIG. 4 is read out in a direction of arrow a and a pulse of signal S2 which corresponds to the edge is an odd-numbered pulse, writing of logic "1"s may be started; and writing of logic "1"s may be stopped in response to the even-numbered pulse. In this case, painting can be achieved by reading of the image data along only one direction.

Figure 9:
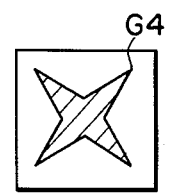

Alternatively, if a differentiator for discriminating the leading or trailing edge is arranged in place of arithmetic circuit 18, the edge image in FIG. 4 can be derived from the painted image in FIG. 9.

Figure 12:
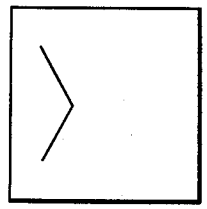
FIGS. 12 and 13 are views for explaining steps in outlining.

In this case, if painted image data PO1 (FIG. 11) read out from first plane memory 17a in the direction of arrow a is input to the clock terminal (CK) of register 21, as shown in FIG. 10, register 21 generates pulse PO' in response to the leading edge of read data (PO1) through the output terminal (Q). Pulse POa' is stored in third plane memory 17c. When all contents are read out from memory 17a, memory 17c stores an edge image (FIG. 12) obtained when the memory is accessed in the direction of arrow a.

Figure 13:
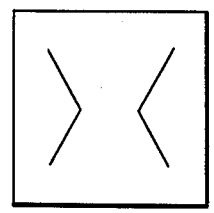

When the painted image data read out from first plane memory 17a in the direction of arrow b is supplied to the clock terminal (CK) of register 21, register 21 generates pulse POb' through the output terminal (Q) in response to the trailing edge of read data. Pulse POb' is stored in third plane memory 17c. When all contents of memory 17a are completely read out, memory 17c stores an edge image (FIG. 13) obtained upon access of the memory in the direction of arrow b. Similarly, painted data is read out in the directions of arrows c and d, and hence the edge image in FIG. 4 is stored in memory 17c.

Figure 14:
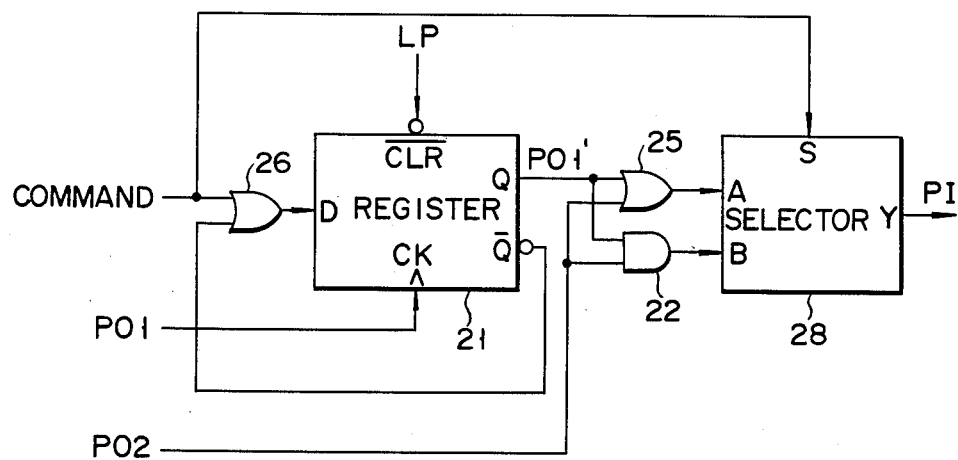
FIG. 14 is a block diagram of an arithmetic/ process circuit of an image processing apparatus according to another embodiment.

FIG. 14 shows a circuit for selecting one of the painting mode and the edge extraction mode. The output terminal of OR gate 26 is connected to terminal D of register 21. The first input terminal of OR gate 26 receives command data, and the second input terminal thereof receives output Q. The command data is set at level "H" in the painting mode. However, the command data is set at level "L" in the edge extraction mode. Data PO' and data P02 are respectively input to the first and second input terminals of OR and AND gates 25 and 27. The output terminals of OR and AND gates 25 and 22 are connected to input terminals A and B of selector 28. Command data is input to set terminal S of selector 28.

In the circuit of FIG. 14, if the command data is set at level "H" (i.e, the painting mode), selector 28 enables terminal B so as to select the output from AND gate 22. However, if the command data is set at level "L" (i.e., the edge extraction mode), selector 28 enables terminal A so as to select the output from OR gate 25.

As is apparent from the above description, one of the painting mode and the edge extraction mode can be selected on the basis of the logical state of the command data.

What is claimed is:

1. An image processing apparatus comprising:
   A/D converter means for converting a video signal representing an image including at least one edge line into digital image data;
   first storage means for storing the image data;
   edge image forming means for forming an edge image defined by the edge line from the image data read out from said first storage means; and
   painting means including second storage means for storing painting data having the same data elements as that of the image data, including the edge image, from said edge image forming means, said painting means being adapted to read out the image data from said first storage means and the painting data from said second storage means, to process the image data and the painting data, and to paint the edge image with the painting data;
   wherein said second storage means comprises a first plane memory for storing the image data, a second plane memory for storing the painting data, and a third plane memory, and said painting means comprises address output means for outputting address data for addressing the image data stored in said first plane memory, and means for performing arithmetic operations of data sequentially read out from said first and second plane memories and storing processed data in said third plane memory.

2. An apparatus according to claim 1, wherein said address output means comprises means for sequentially generating address data so as to address said plane memories in two or four directions.

3. An apparatus according to claim 1, wherein said painting means comprises: edge detecting means for sequentially detecting an edge of the edge image upon readout of the image data from said first memory means according to the addressing directions; and means for enabling painting data write operation in response to an odd-numbered edge detected by said edge detecting means and for disabling the painting data write operation in response to an even-numbered edge detected by said edge detecting means.

4. An apparatus according to claim 1, wherein said A/D converter means converts a video signal from an X-ray apparatus into the digital image data.

5. An apparatus according to claim 1, wherein said A/D converter means converts a video signal from an ultrasonic apparatus into the digital image data.

6. An apparatus according to claim 1, wherein said A/D converter means converts a video signal from an MRI apparatus into the digital image data

* * * * *